(12) United States Patent
Nuzum et al.

(10) Patent No.: US 10,176,489 B2
(45) Date of Patent: *Jan. 8, 2019

(54) MOBILE SYSTEM AND METHOD FOR EXCHANGING POINT VALUE

(71) Applicant: First Data Corporation, Greenwood Village, CO (US)

(72) Inventors: Todd Nuzum, Omaha, NE (US); Brian Friedman, Omaha, NE (US); Virginia G. Sayor, Castle Rock, CO (US)

(73) Assignee: First Data Corporation, Greenwood Village, CO (US)

( * ) Notice: Subject to any disclaimer, the term of this patent is extended or adjusted under 35 U.S.C. 154(b) by 1176 days.

This patent is subject to a terminal disclaimer.

(21) Appl. No.: 14/465,626

(22) Filed: Aug. 21, 2014

(65) Prior Publication Data

US 2015/0046245 A1 Feb. 12, 2015

Related U.S. Application Data

(63) Continuation of application No. 11/838,700, filed on Aug. 14, 2007, now Pat. No. 8,838,472.

(51) Int. Cl.
*G06Q 30/00* (2012.01)
*G06Q 30/02* (2012.01)
(Continued)

(52) U.S. Cl.
CPC ......... *G06Q 30/0233* (2013.01); *G06Q 20/06* (2013.01); *G06Q 20/20* (2013.01); *G06Q 20/202* (2013.01); *G06Q 20/32* (2013.01); *G06Q 20/3278* (2013.01); *G06Q 30/0212* (2013.01); *G06Q 30/06* (2013.01)

(58) Field of Classification Search
None
See application file for complete search history.

(56) References Cited

U.S. PATENT DOCUMENTS 4,317,957 A 3/1982 Sendrow
5,557,516 A 9/1996 Hogan
(Continued)

FOREIGN PATENT DOCUMENTS

EP 0 911 772 4/1999
WO 01/41419 6/2001

OTHER PUBLICATIONS

Kageyama, Yuri; "Japanese carrier unveils mobile phone wallet." Retrieved on Aug. 9, 2018 from https://usatoday30.usatoday.com/tech/wireless/phones/2004-07-22-wallet-phone_x.htm.*
(Continued)

*Primary Examiner* — Olabode Akintola
(74) *Attorney, Agent, or Firm* — Kilpatrick Townsend & Stockton LLP

(57) ABSTRACT

A transaction is conducted at a merchant location using redeemed loyalty points maintained in a loyalty point account for a customer. The transactions are conducted using a mobile device at a POS terminal. In response to receiving a customer ID from the mobile device, a loyalty server provides the monetary value of loyalty points. The customer may use the mobile device to redeem those points and have the value transferred into a financial account. A payment processing system connected to the POS terminal completes the transaction using the financial account.

19 Claims, 6 Drawing Sheets

(51) Int. Cl.
  *G06Q 20/06* (2012.01)
  *G06Q 20/20* (2012.01)
  *G06Q 20/32* (2012.01)
  *G06Q 30/06* (2012.01)

(56) References Cited

U.S. PATENT DOCUMENTS

| | | | |
|---|---|---|---|
| 5,692,132 | A | 11/1997 | Hogan |
| 5,943,423 | A | 8/1999 | Muftic |
| 6,078,806 | A | 6/2000 | Heinonen et al. |
| 6,119,931 | A | 9/2000 | Novogrod |
| 6,226,623 | B1 | 5/2001 | Schein et al. |
| 6,473,500 | B1 | 10/2002 | Risafi et al. |
| 6,940,466 | B2 | 9/2005 | Terry |
| 7,004,385 | B1 | 2/2006 | Douglass |
| 7,020,633 | B2 | 3/2006 | Strayer et al. |
| 7,089,208 | B1* | 8/2006 | Levchin .......... G06Q 20/02 705/39 |
| 7,103,570 | B1 | 9/2006 | Morea et al. |
| 7,130,817 | B2 | 10/2006 | Karas et al. |
| 7,562,813 | B2 | 7/2009 | Humphrey et al. |
| 7,865,448 | B2 | 1/2011 | Pizarro |
| 8,838,472 | B2 | 9/2014 | Nuzum et al. |
| 2001/0027439 | A1 | 10/2001 | Holtzman et al. |
| 2001/0054003 | A1* | 12/2001 | Chien ............ G06Q 20/04 705/14.17 |
| 2002/0046106 | A1 | 4/2002 | Ishibashi et al. |
| 2002/0116285 | A1 | 8/2002 | Ito |
| 2002/0120582 | A1 | 8/2002 | Elston et al. |
| 2002/0123965 | A1 | 9/2002 | Phillips |
| 2003/0018532 | A1 | 1/2003 | Dudek et al. |
| 2004/0030601 | A1 | 2/2004 | Pond et al. |
| 2004/0127256 | A1 | 7/2004 | Goldthwaite et al. |
| 2004/0267663 | A1 | 12/2004 | Karns et al. |
| 2005/0010525 | A1 | 1/2005 | Ross |
| 2005/0187873 | A1 | 8/2005 | Labrou et al. |
| 2005/0211760 | A1 | 9/2005 | Dewan et al. |
| 2005/0222961 | A1 | 10/2005 | Staib et al. |
| 2006/0219776 | A1 | 10/2006 | Finn |
| 2007/0057038 | A1 | 3/2007 | Gannon |
| 2007/0239523 | A1* | 10/2007 | Yi .............. G06Q 30/0207 705/14.1 |
| 2008/0011837 | A1* | 1/2008 | Wesley .......... G06Q 20/20 235/383 |
| 2008/0015014 | A1 | 1/2008 | Weiss |
| 2008/0167017 | A1 | 7/2008 | Wentker et al. |
| 2008/0208742 | A1 | 8/2008 | Arthur et al. |
| 2008/0210753 | A1 | 9/2008 | Plozay et al. |
| 2009/0048916 | A1 | 2/2009 | Nuzman et al. |

OTHER PUBLICATIONS

Harris, Christian, "Nokia's First NFC Product—Why it's Important" http://digital-lifestyles.info/display_page.asp?section=distribution&id=174, 3 pages, Nov. 4, 2004.

Nokia Communications, "Nokia Unveils the world's first NFC product—Nokia NFC shell for Nokia 3220 phone," http://press.nokia.com/PR/200411/966879_5.html, 2 pages, Nov. 2, 2004.

O'Connor, Mary Catherine, "RFID Phone Payment Systems Good to Go" file://C:\Documents and Settings \sfj\Local Settings \Temporary Internet Files\OLK20\ER., 3 pages, Apr. 21, 2005.

Saleem, Rae, "Preferred Payment Architecture: Local Payment," published by Mobey Forum, dated Sep. 2002.

Ortiz, Jr. Sixto, "Is Near-Field Communication Close to Success?" IEEE Computer Society, Computer Magazine, vol. 39, Issue 3, Mar. 2006, pp. 18-20.

PCT International Search Report and Written Opinion dated Nov. 14, 2008, International Application No. PCT/US2008/073051, 11 pages.

\* cited by examiner

USER ID TABLE - USER ID   XXXXX  ~314

| | |
|---|---|
| 316 — DEBIT CARD ACCOUNT | XXXXXX |
| 318 — LOYALTY ACCOUNT 1 | XXXXX |
| LOYALTY ACCOUNT 2 | XXXXX |

LOYALTY MEMBER TABLE - USER ID   XXXX

| | PT BAL (330) | VALUE (332) |
|---|---|---|
| 328 — LOYALTY ACCOUNT 1 | 50,256 | 52.30 |
| LOYALTY ACCOUNT 2 | 10,350 | 25.06 |

MOBILE SYSTEM AND METHOD FOR EXCHANGING POINT VALUE

CROSS-REFERENCES TO RELATED APPLICATIONS

This application is a Continuation of U.S. application Ser. No. 11/838,700, filed Aug. 14, 2007, and entitled "MOBILE SYSTEM AND METHOD FOR EXCHANGING POINT VALUE," which is incorporated by reference herein.

BACKGROUND OF THE INVENTION

In recent years, there has been a steady proliferation of loyalty, coupon and rebate programs offered to consumers. There are a variety of different models on which such programs are based, but a common feature is that they offer an incentive (in the form of points or other non-monetary items) designed to encourage customers to conduct business with one organization rather than with competitor organizations. In the case of loyalty programs, they often take the form of point systems in which a customer is credited or rewarded with a number of points for each transaction and is entitled to later exchange or redeem accumulated points for goods and/or services.

One longstanding example is the loyalty system used in the airline industry. An airline typically offers a number of points to each consumer that is correlated with the distance traveled. At certain levels, the points may be exchanged by the consumer for airline tickets.

Sometimes, customers receiving loyalty points may not want to redeem them for transactions with the issuing entity. As an example, a traveler receiving air travel points from one airline may rarely travel with that same airline and thus have no occasion to redeem the points in the future. Such points may have value (assigned by the issuer or by market trading), but the issuer may not have a mechanism in place to permit the points to be exchanged for cash, particularly at times to suit the needs of the customer. Systems for transferring points (and receiving value in return) are either not readily available, or are not convenient to use.

Thus, there is a general recognition in the industry of a need for loyalty-based and other systems that permit redemption of loyalty points or the like into cash.

BRIEF SUMMARY OF THE INVENTION

There is provided, in accordance with embodiments of the present invention, a mobile system and method for a consumer to conduct a transaction at a point of sale (POS) terminal using redeemed points (e.g., loyalty reward points).

In one embodiment, a system is provided for redeeming the value of points, wherein the points are held in a point account maintained on behalf of a customer, and wherein the redeemed value may be transferred into a transaction account. The system includes a mobile device used by the customer for transmitting a mobile customer ID identifying the mobile device, wherein the mobile customer ID is associated with the point account. A terminal provides a location for redeeming the value of points, the terminal including a reader for receiving the mobile customer ID data, and using the transaction account to conduct a transaction at the terminal. The system further includes a point database for storing point account data, including the number of points in the point account held for the customer and a value associated with the points, and a value server accessing the point database in response to the customer ID received from the mobile device at the terminal. The point database determines the value of points held in the point database, so that value associated with points in the point database may be transferred into the transaction account.

A more complete understanding of the present invention may be derived by referring to the detailed description of the invention and to the claims, when considered in connection with the Figures.

BRIEF DESCRIPTION OF THE DRAWINGS

FIGS. 3a and 3b are diagrams illustrating an exemplary user ID table within the payment processing database and an exemplary loyalty member table within the loyalty member database of FIG. 1.

DETAILED DESCRIPTION OF THE INVENTION

There are various embodiments and configurations for implementing the present invention. Generally, embodiments provide systems and methods to permit a consumer to conduct a transaction at a point of sale (POS) terminal using redeemed loyalty points, coupons and other non-monetary items of value.

In one embodiment, the consumer has accumulated loyalty points that are maintained in a loyalty account, such as frequent flier points awarded by an airline. The transaction at the POS terminal is conducted by the consumer using a wireless device (e.g., wireless phone) that acts as a "smart card" or similar presentation instrument (e.g, a financial card, such as a credit or debit card with processing/memory features). The wireless device facilitates the transaction by permitting the consumer to select the loyalty account from which points are to be redeemed, transfer the redeemed cash value to a financial account (e.g., a checking account), and then use the financial account to conduct the transaction at the POS terminal.

For convenience, the units (e.g., loyalty points) which are redeemed may be referred to herein as "points," but it should be appreciated that embodiments of the invention may use any units or items having redeemable value. Examples of "points" maintained and accumulated in an account from which redemptions may be made include loyalty reward points, frequent flier miles, electronic or paper coupons issued by a retailer, telephone minutes, store credits, and vouchers, as well as any other items that may be traded, awarded or issued by an entity (such as for purposes of providing a reward or incentive for doing business), that are not cash themselves, but that may be redeemed for cash (either through the issuing entity or a different entity).

Figure 1:
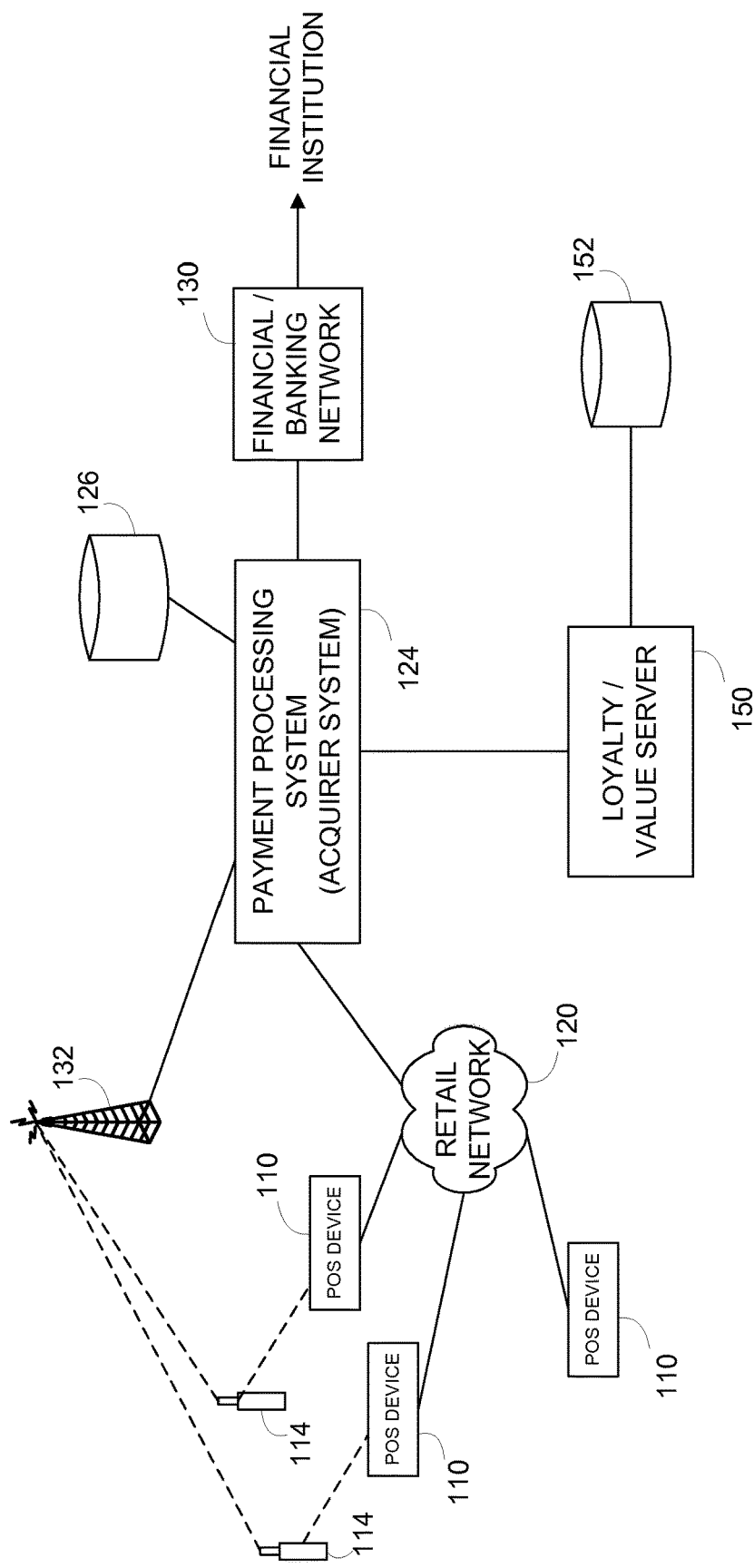
FIG. 1 is a general block diagram of a network for processing transactions using redeemed loyalty points.

Referring now to FIG. 1, a network 100 according to one embodiment is illustrated. Consumers or customers may conduct transactions at merchant locations (e.g., purchase goods) using POS devices or terminals 110 and wireless telephones 114 other mobile devices (personal digital assistance (PDA), MP3 player, pocket computer, etc.). The wireless telephones are used in lieu of financial cards (credit cards, debit cards, etc.), and employ RFID (radio frequency identification) technology as well as wireless telephone communications to conduct transactions.

When a transaction is to be conducted in network 100, the POS terminal 110 has an RFID reader (not shown) that detects and receives identifying data (e.g., a mobile device serial no., an account number, or other customer ID) from an RFID tag (not shown) in one of the wireless telephones 114, such as by short range signaling complying with Near Field Communications (NFC) protocols and standards. The ID from the wireless telephone 114 is provided via a retail network 120 to a payment processing system 124, which has an associated database 126 for looking up account numbers and other consumer data associated with the customer ID. The payment processing system then provides the customer account numbers and other identifying and transaction data (such as the product ID for goods being purchased and their purchase price) to the customer's financial institution (e.g., a bank) through a financial/banking network 130 connected to the payment processing system 124. If the account ID and transaction data are approved by the financial institution, then the payment processing system 124 initiates mobile communications to the wireless device through a mobile telephone network 132, in order to verify or authenticate identity of the customer (e.g., confirming customer entry of a PIN at a keypad on the telephone 114) and to confirm the transaction is to be conducted using his/her financial account. The transaction is completed at the payment processing system 124 and the amount of the transaction is posted to the consumer's account at his/her financial institution.

Various systems and method for using wireless telephones at POS terminals to conduct transactions (including the system and method as described above) can be found in U.S. patent application Ser. No. 10/969,780, entitled "Methods and Systems for Performing Credit Transactions With a Wireless Device," filed Oct. 19, 2004, by Christian Pizarro et al., U.S. patent application Ser. No. 11/382,647, entitled "System And Method For Activating Telephone-Based Payment Instrument, filed May 10, 2006, by Wendy Humphrey et al., U.S. Provisional Patent Application No. 60/911,113, entitled "Mobile Commerce Infrastructure Systems and Methods," filed Apr. 11, 2007, by Brian Friedman, U.S. patent application Ser. No. 11/830,420, filed Jul. 30, 2007, entitled "Provisioning Of a Device for Mobile Commerce" by Steven E. Arthur et al. and U.S. Patent Application Publication No. 2004/0030601, entitled "Electronic Payment Methods for a Mobile Device," filed Aug. 6, 2003, by Russell L. Pond et al., each of which is hereby incorporated by reference.

As illustrated in FIG. 1, the payment processing system 124 may be associated with or part of an acquirer (credit card processing) system or network for convenience in facilitating certain aspects of the invention, although it should be appreciated that the payment processing system 124 could be implemented by a computer host or server at any financial or other institution, whether part of an acquirer system or not. However, if the payment processing system is part of an acquirer system, it can be of the type disclosed in U.S. patent application Ser. No. 11/681,689, entitled "Loyalty Reward Settlement System And Method," filed Mar. 2, 2007 by Molly Plozay et al., which application is hereby incorporated by reference.

Also shown in FIG. 1 is a loyalty/value server 150, which may be associated with and manage several databases, including a loyalty database 152. The server 150 and database 152 manage loyalty program data for customers that may be using the network 100 in order to conduct transactions at the POS terminals 110. In one embodiment, and as will be described in greater detail later, the loyalty data in database 152 is maintained for those customers that have enrolled in a program for using loyalty points to exchange for monetary value or cash when conducting transactions. Thus, each customer that desires to exchange loyalty points would enter loyalty account information (account number IDs and so forth) for selected loyalty accounts when enrolling, and the loyalty server 150 would thereafter periodically contact the loyalty program operator to update the database 152 and maintain loyalty account balances (as well as other information) pertaining to the loyalty accounts for that customer.

In other embodiments, the loyalty accounts themselves may be operated or administered by the acquirer system/network that operates payment processing system 124, and thus the loyalty server loads loyalty account points and other information into the database 152 as transactions are conducted at the POS terminals 110. Such an arrangement is particularly feasible if the acquirer system itself administers the loyalty program to which consumers belong, such as where points are awarded for transactions conducted using a credit card processed at the acquirer system. An example of such a loyalty program and its administration at an acquirer system can be found in aforementioned U.S. patent application Ser. No. 11/681,689. In yet other embodiments, the loyalty server 150 and database 152 may maintain loyalty account balances for both programs administered by the acquirer system as well as programs administered by others. As should be apparent, if loyalty account balances are maintained at database 152 for loyalty programs not administered by the acquirer system, then it would be desirable for the acquirer system or server 150 to periodically access the databases of the program administrator and retrieve current loyalty point balances, in order to maintain loyalty program balances that are current and reflect any recent loyalty program transactions by the enrolled consumer.

As will be described later in conjunction with FIG. 3b, the database 152 also maintains data pertaining to the current value of points maintained in the loyalty account. This can be done by establishing values for various loyalty program points at database 152, either pursuant to agreement between the acquirer system operator and the issuer of the points, or pursuant to criteria established by the operator of the acquirer system and reflecting the value of the points if they were traded in the open market. As should appreciated, the issuer of loyalty points will often have an incentive to establish a value for the points because they make the points more useful to the consumer, and thus make it more likely that the consumer will want to conduct transactions or make purchases that result in loyalty points being awarded. The value can of course be determined by other market conditions, e.g., where the points being maintained are not loyalty points but rather are other non-monetary items provided to consumers, such as coupons. In such case, the acquirer system operator can establish value based on what other parties may be willing to pay for them, less an appropriate fee for facilitating the transaction.

Thus, a consumer that is using wireless phone 114 and that has his/her loyalty program balances maintained at database 152 may exchange the value of the points for cash or other monetary value that may be deposited or loaded into accounts that are used for making purchases at POS terminals 110. As an example, if the consumer is conducting a transaction with wireless phone 114 and determines that the balance of funds in his debit card (checking) account are not sufficient to make a purchase at the POS terminal 110, he may use the wireless phone 114 to select a loyalty program to which he/she belongs, use the value of those points to deposit cash or monetary value to his debit card account in an amount sufficient to make a purchase, and then proceed with the transaction at the POS terminal 110.

Figure 2:
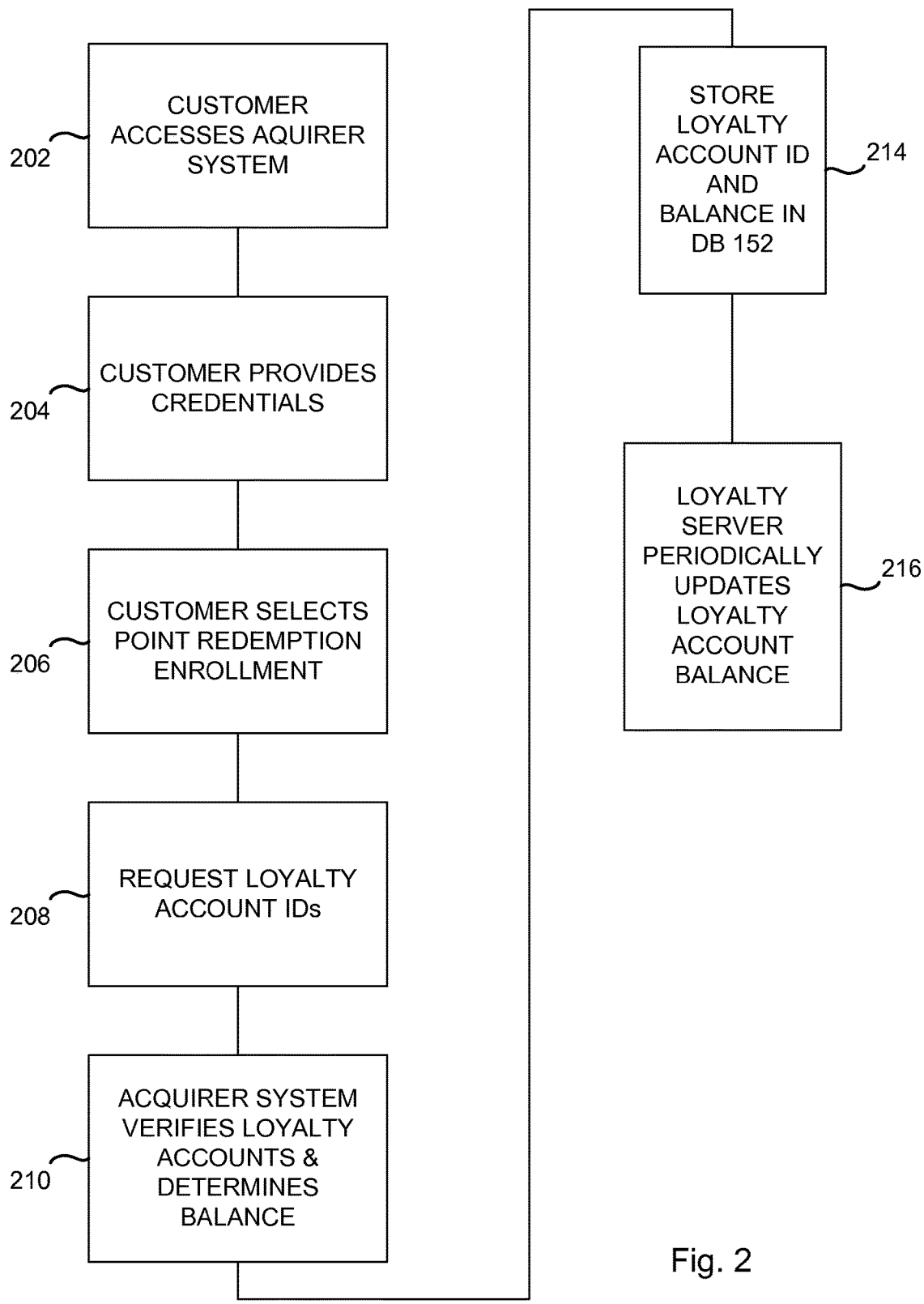
FIG. 2 is a flow diagram illustrating a method for enrolling a customer in a loyalty redemption program operated at the payment processing system in the network of FIG. 1.

Referring now to FIG. 2, a method is illustrated for a consumer to enroll in a loyalty point redemption program operated by the payment processing/acquirer system 124, and that permits the consumer to redeem loyalty points for cash that may be loaded into a bank account (e.g., checking account) of the consumer.

Initially, at step 202, the customer accesses the operator of the payment processing system in order to enter appropriate enrollment information. The access to the system may be via a website or may be via telephone and an interactive voice responses (IVR) system. It is assumed that the customer is already known to the system because he/she has previously purchased a wireless telephone 114 capable of conducting transactions at POS terminals 110, has activated the phone to conduct transactions, and has established a PIN to be used to authenticate the customer when conducting transactions (an example of such activation methods is described in aforementioned U.S. application Ser. No. 11/382,647). Thus, the identity of the customer can be verified by the PIN or biometric information (e.g., voice recognition) already established for the customer. The customer then provides (step 204) credentials to the system 124 (e.g., identification of the wireless device, account number for an existing bank account, name and address of the customer, PIN or biometric identification). A menu of possible transactions or tasks may be provided to the customer, and if so the customer selects an enrollment option at step 206.

The system then requests the customer enter the account numbers or IDs of the loyalty programs for which points may be redeemed (step 208). In the present embodiment, it is assumed that the acquirer system does not administer the loyalty programs, and so depending on the specific loyalty program, the customer may also be requested to enter a PIN or pass word already established for the customer to access the loyalty account, so that the system 124 can likewise be authorized to access the account.

The system 124 contacts the system administering the loyalty program, in order to verify the existence of the loyalty account, authenticate the customer (e.g., verify proper PIN entry) and determine the balance in the loyalty account (step 210). The system 124 stores the balance (with the associated loyalty account ID) in database 152 (step 214). The system 124 also thereafter periodically contacts the system administering the loyalty program in order to update the balance in the loyalty account (step 216).

FIGS. 3a and 3b illustrate exemplary data maintained within databases 126 and 152 after a customer has enrolled at system 124 for proposes of redeeming loyalty points. As seen in FIG. 3a, the database 126 has a user table 312 that associates, with each user or customer ID 314, one or more bank accounts 316 and one or more loyalty accounts 318. The user ID might be the previously mentioned customer ID (or a derivative of the customer ID) that is transmitted in the form of RFID signals by the wireless telephone 114 and received at an RFID reader at one of the POS terminals 110. The bank accounts 316 (such as the illustrated debit account) would have already been present in the database 126, i.e., stored after the customer has purchased and activated a wireless phone to conduct transactions at POS terminals 110 using that bank account. The loyalty accounts are loaded into database 126 as part of the enrollment process seem in FIG. 2.

As seen in FIG. 3b, the database 152 has a loyalty member table 324 that associates, with each enrolled loyalty account 328, the loyalty point balance 330 for each account, and the current exchangeable value 332 (in cash) of that balance.

As mentioned earlier, the value of points in each loyalty account can be established by various methods. The issuer of the loyalty points may establish a cash value (for which the points can be redeemed through the issuer). Alternatively, the operator of the payment processing/acquirer system 124 may establish a value based on a process through which such points can be sold or purchased by third parties. In each instance, the operator of system 124 may discount the value to reflect a charge by the operator to redeem points for cash when transactions are conducted within network 100.

Figure 4:
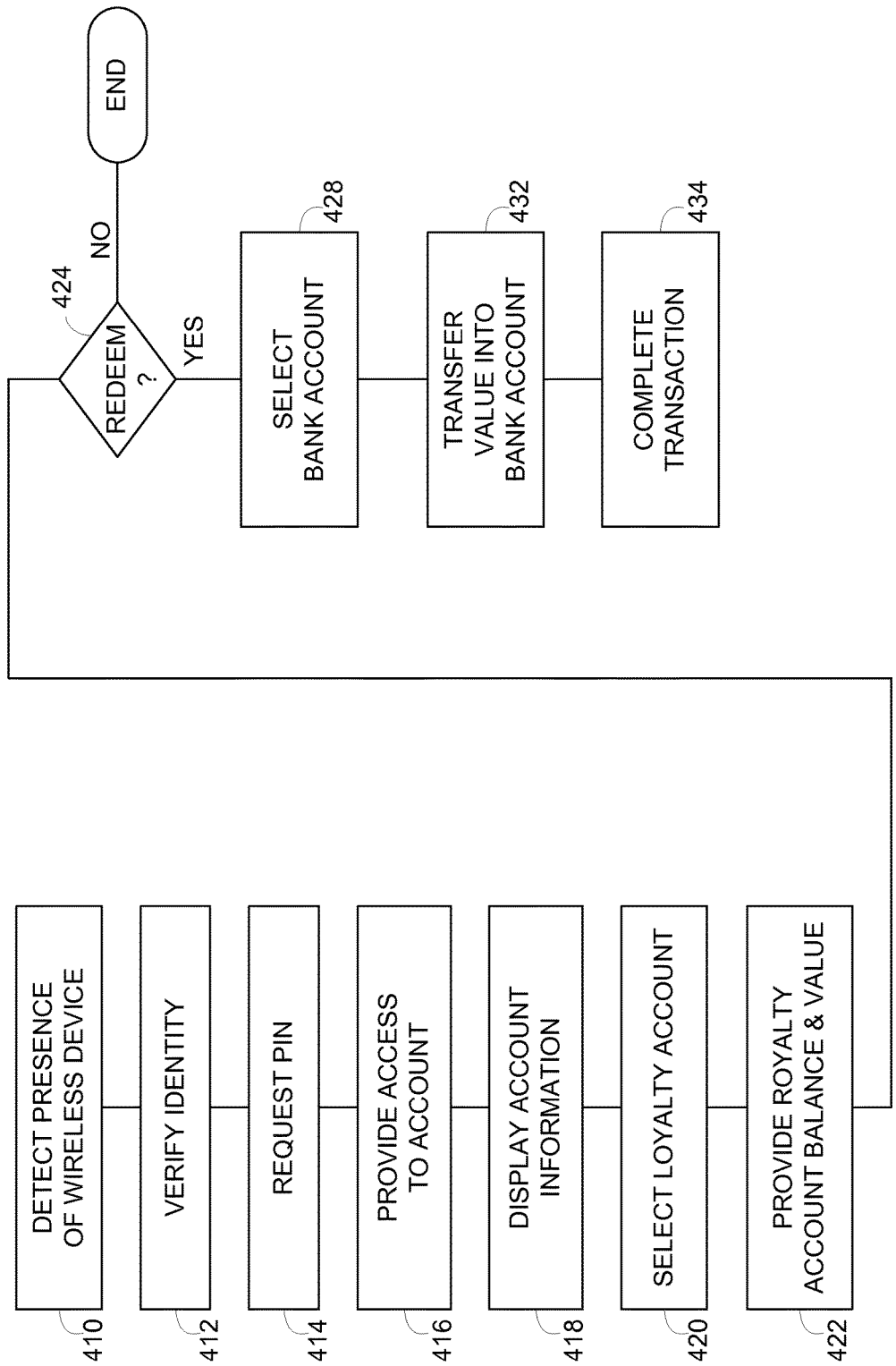
FIG. 4 is a flow diagram illustrating a method for processing transactions in the network of FIG. 1, using redeemed loyalty points.

FIG. 4 illustrates a method for using the wireless telephones 114 to conduct transactions at POS terminals 110, with points redeemed and deposited into a bank account of a customer. The various steps in the method of FIG. 4 are implemented by programming loaded into phone 114 when enrolling in the redemption program (FIG. 2) in conjunction with programming steps implemented at payment processing system 124.

When a customer is shopping at a merchant and desires to make a purchase, he positions his telephone 114 in close proximity to the POS terminal 110, which causes the RFID reader at the POS terminal to detect the presence of (and receive the customer ID from) mobile telephone 114 (step 410). The payment processing system verifies the identity of the customer (step 412) at database 126 (checking for the appropriate user ID within table 312—FIG. 3a), and communicates through wireless network 132 in order to request entry of a PIN at the telephone 114 (step 414). If the user is authenticated by proper entry of a PIN, the payment processing system 124 provides access to the user's account information and displays the account information (e.g., account number) at the telephone 114 (steps 416, 418). While not seen in FIG. 4, the customer may also be given the purchase price of goods and the account balance in his bank or financial account for purposes of paying for the goods. In order to illustrate the present embodiment, it is assumed that the bank account does not have a sufficient balance to purchase the goods, and so the customer selects a loyalty account from which point are to be redeemed (step 420). The payment processing system provides information on the loyalty account and its point balance and the corresponding cash value (step 422), and the customer is asked whether a redemption is to be made (step 424). The customer then selects the bank account into which the cash is to be deposited (step 428), and that amount is transferred by payment processing system 124 into the account though the financial network 130 and the customer's financial institution maintaining the bank account (step 432). The customer then completes the transaction by authorizing the purchase price to be paid from the banking account (step 434).

While not seen in FIG. 4, the payment processing system may also reconcile accounts associated with the loyalty program operator or administrator (deduct the value of the redeemed points from a financial account of the loyalty program operator).

Figure 5:
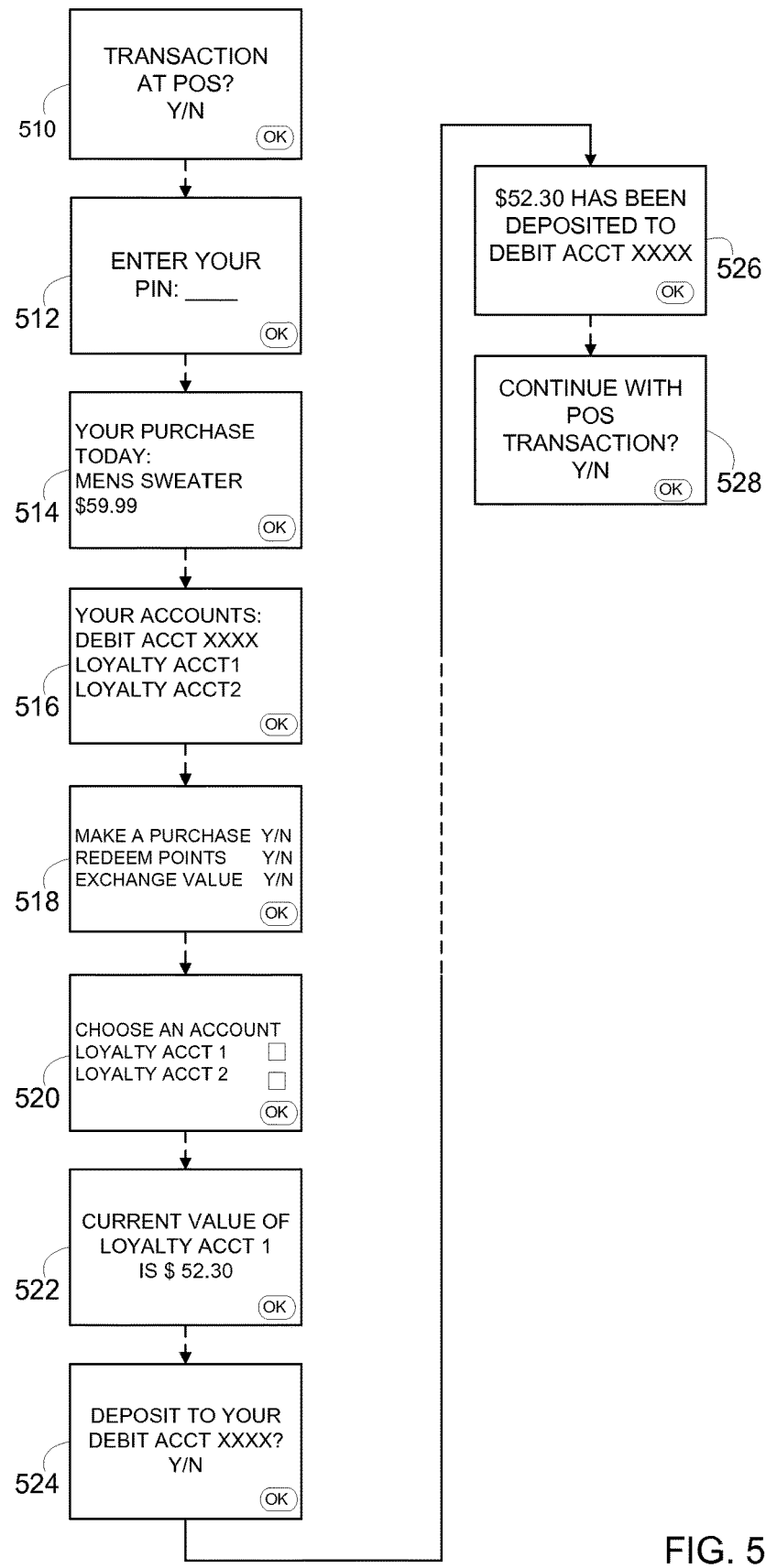
FIG. 5 illustrates exemplary screens appearing on the wireless device used for conducting transactions in the network of FIG. 1.

FIG. 5 illustrates the screens seen at wireless telephone 114 when the customer conducts a transaction illustrated by the program steps of FIG. 4. Such screens are displayed by executing software programs loaded into telephone 114 (e.g., when the customer enrolls in the loyalty point redemption program as described in conjunction with FIG. 2), with program steps executed in response wireless signals/communications received at telephone 114.

As seen, when a customer approaches a POS terminal 110 and transmits RFD signaling (such as in the form of NFC protocols and standards) to the POS terminal, the POS device detects the presence of telephone 114 and receives the customer ID of the telephone and initiates communications through the wireless network 132, causing screen 510 to be displayed asking if the customer desires to conduct a transaction. If the customer answers "yes," he is requested to enter his pin (screen 512), with transaction data (the transaction at the POS terminal) displayed at screen 514 and his accounts displayed at screen 516 (both his debit account and as well as any loyalty accounts). Although not shown, it might be desirable for balances to also displayed (at least for the debit account) so that the customer knows whether there are sufficient funds in the account to make a purchase at the POS terminal.

The customer then makes a selection of the transaction at screen 518, which in this case is assumed to be a redemption of points since there are insufficient funds in the debit account for the transaction. The customer has two loyalty accounts displayed at screen 520, in order to select the loyalty account to have points redeemed, and the value of those points is displayed at the next screen 522. The customer is asked whether to deposit the value of the redeemed points at screen 524. While not shown, the screen could be arranged to permit only a portion of the point value to be transferred if the total value of the points is more than what is needed to conduct the POS transaction.

At screen 526 the confirmation of the transfer is shown, and then at screen 528 the customer may elect to return to the POS transaction (e.g., return to screen 518 where a purchase transaction is elected).

Figure 6:
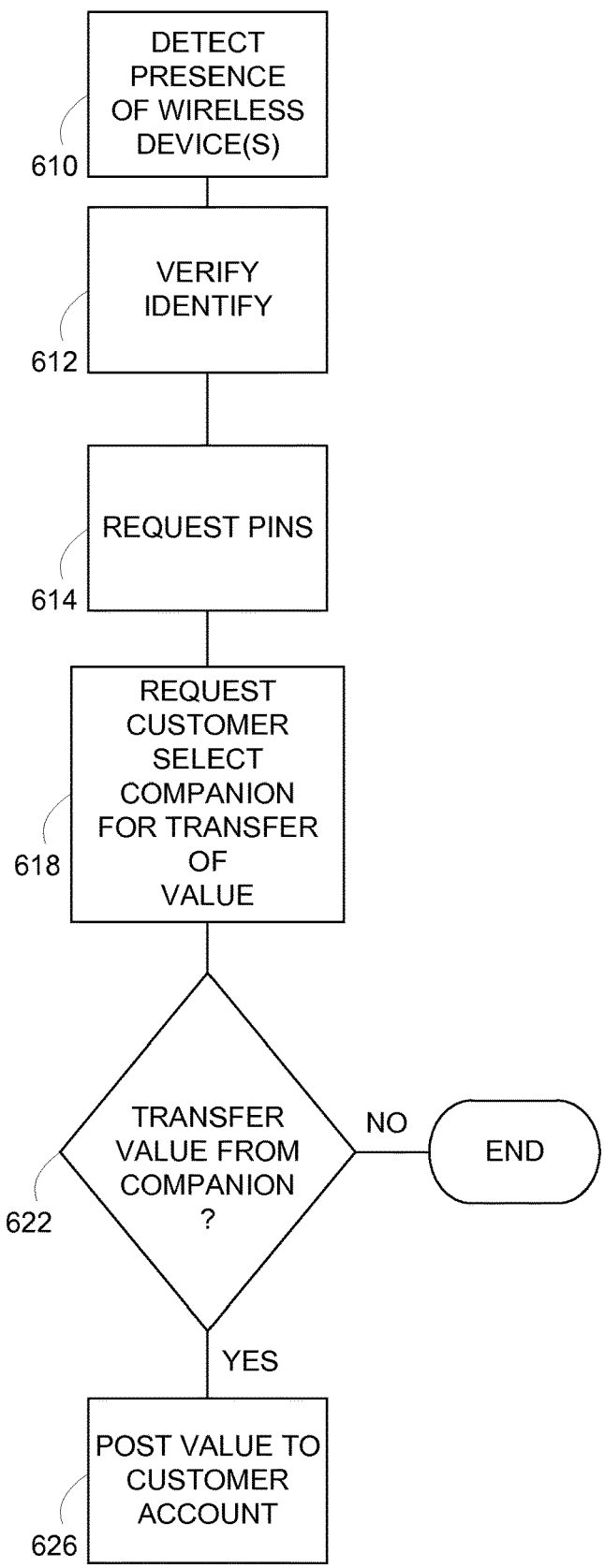
FIG. 6 is a flow diagram illustrating an alternative embodiment, where a customer having a wireless telephone for conducting transactions in the network of FIG. 1 has loyalty point value transferred from the loyalty account of a companion having a wireless telephone.

In some embodiments, more than one customer (loyalty member) may be involved in a transaction. FIG. 6 illustrates an alternate embodiment where two customers (e.g., one customer is a companion of the other) are at an merchant location, and one of the customers wants to make a purchase but does not have sufficient value in his/her loyalty point accounts in order to make a purchase. That customer can request transfer of point value from the companion customer, and have the value posted to his/her financial account.

As seen, the POS terminal detects the presence, verifies the identify and requests PINS from both customers (steps 610, 612, 614). When the two customers have been verified, the POS terminal may assume that there is a desire to pass point value from one customer to the other because they have been detected and verified at about the same time by the same POS terminal (e.g., if using NFC communications, both wireless telephone 114 would have been positioned at or near the POS RFID reader simultaneously). However, other forms of RFID or wireless communications could be used, perhaps requiring the POS terminal to seek out the companion customer (from a telephone number or other ID provided by the customer wanting to make the purchase), since perhaps the companion and his phone may not be nearby or even at the same merchant location. The POS terminal 110 requests (step 618) the customer select his companion (such as by displaying his phone number or his name), and both the customer and his companion are thereafter asked at their telephone displays (step 622) whether the transfer is to be made. Once confirmed, the value of loyalty points from the loyalty account of the companion is transferred and posted to the financial account of the customer (via the payment processing system 124) at step 626.

It can be seen from the preceding discussion that the present invention provides a novel method and system for providing systems and methods to permit a consumer to conduct a transaction at a point of sale (POS) terminal using redeemed loyalty points, coupons and other non-monetary items of value. While detailed descriptions of presently preferred embodiments of the invention have been given above, various alternatives, modifications, and equivalents will be apparent to those skilled in the art without varying from the spirit of the invention. For example, while the described embodiments provide a bank account as the transaction account into which loyalty point value may be transferred in order to complete a transaction, that transaction account could be any kind of stored value account such a gift card account, money transfer account, or other account that stores units of money or value. The transaction account could also be a loyalty point account itself, which a customer may be using (via redemption) to purchase goods or services. In such case, the value of points being transferred are converted into points that are useable for redemption in the transaction account.

Therefore, the above description should not be taken as limiting the scope of the invention, which is defined by the appended claims.

What is claimed is:

1. A system for redeeming the value of points that are issued by one of multiple loyalty programs, wherein the points for each loyalty program are held in a point account maintained on behalf of a customer, and wherein the redeemed value of points in the point account may be transferred into a transaction account for conducting a purchase transaction with a third party, the system comprising:

a single terminal providing a location for both (1) redeeming the value of points held by a first mobile customer and (2) conducting a transaction with a third party at the location by a second mobile customer that is a companion of the first mobile customer, the terminal including at least one reader for receiving a first mobile customer ID transmitted by a first mobile device for identifying the first mobile device and a second mobile customer ID transmitted by a second mobile device for identifying the second mobile device, the first mobile customer ID associated with the point account, the second mobile customer ID associated with the transaction account for conducting the transaction with the third party, the terminal using the transaction account to conduct the transaction with the third party at the terminal, the reader using signaling for the terminal to determine, from the receipt of the first mobile customer ID and a second mobile customer ID at about the same time, that the first mobile device and the second mobile device are positioned at or near the reader simultaneously and that the first mobile customer and the second mobile customer are companions, with the terminal communicating with both the first mobile device and the second mobile device to verify the identity of both the first mobile customer and the second mobile customer and confirm that both the first mobile customer and the second mobile customer approve of transferring the redeemed value of points from the point account into the transaction account;
a point database for storing point account data, including data associated with the number of points in the point account and associated with a value of the points; and
a server accessing the point database in response to the first mobile customer ID received from the first mobile device at the terminal for determining the value of points held in the point account, in order to transfer value associated with points in the point account into the transaction account, whereby the second mobile customer conducts the transaction with the third party using the transferred value of points held on behalf of the first customer in the point account.

2. The system of claim 1, wherein the transaction account is a stored value account maintained on behalf of the second customer.

3. The system of claim 2, wherein the stored value account is an account maintained by a financial institution maintained on behalf of the second customer, and wherein the value associated with points that is transferred into the stored value account is a monetary amount.

4. The system of claim 3, wherein the stored value account is a debit card account.

5. The system of claim 1, wherein the third party is a merchant.

6. The system of claim 1, wherein the signaling used by the reader is short range signaling.

7. The system of claim 6, wherein the first and second mobile devices are each a wireless telephone having an RFID tag for transmitting a mobile customer ID, and the terminal includes an RFID reader for receiving the first and second mobile customer IDs.

8. The system of claim 1, wherein the points are loyalty reward points, and wherein the point account is a loyalty point account that stores a record of accumulated loyalty points.

9. The system of claim 1, wherein the points are electronic retailer coupons accumulated by the first customer and each having a redeemable value, and wherein the point account stores a record of the coupons accumulated by the first customer.

10. The system of claim 1, wherein both the point account and the transaction account are both loyalty reward point accounts.

11. The system of claim 1, wherein the terminal is a POS terminal where transactions may be conducted, and wherein the value transferred into the transaction account is used for payments made for those transactions.

12. The system of claim 1, further comprising:
a payment processing server connected for receiving the first and second mobile customer IDs from the terminal; and
a payment processing database storing in relation to the first mobile customer ID, a point account ID, and in relation to the second mobile customer ID, a transaction account ID;
wherein the payment processing server accesses the payment processing database using the first mobile customer ID to retrieve a point account ID, and provides the retrieved point account ID to the value server.

13. The system of claim 12, wherein the payment processing server is part of an acquirer system operated by a credit card processing entity.

14. The system of claim 1, further comprising:
a processing system that periodically accesses each loyalty program in order to receive the current balance of points issued by that loyalty program for the first mobile customer, and that provides the current balance of points to the point database in order to update the stored number of points held for the first mobile customer.

15. The system of claim 1, wherein the terminal communicates with at least one of the first and second mobile devices to display an ID associated with the other of the first and second mobile devices, in order for the user at the one of the first and second mobile devices to select the user of the other of the first and second mobile devices as a companion.

16. A method for redeeming the value of points that are issued by one of multiple loyalty programs, wherein the points for each loyalty program are held in a point account maintained on behalf of a customer, and wherein the redeemed value of points in the point account may be transferred into a transaction account for conducting a purchase transaction with a third party, the system comprising:
providing, at a single terminal, a location for both (1) redeeming the value of points held by a first mobile customer and (2) conducting a transaction with a third party at the location by a second mobile customer that is a companion of the first mobile customer, the terminal including at least one reader for receiving a first mobile customer ID transmitted by a first mobile device for identifying the first mobile device and a second mobile customer ID transmitted by a second mobile device for identifying the second mobile device, the first mobile customer ID associated with the point account, the second mobile customer ID associated with the transaction account for conducting the transaction with the third party, the terminal using the transaction account to conduct the transaction with the third party at the terminal, the reader using signaling for the terminal to determine, from the receipt of the first mobile customer ID and a second mobile customer ID at about the same time, that the first mobile device and the second mobile device are positioned at or near the reader simultaneously and that the first mobile customer and the second mobile customer are companions, with the terminal communicating with both the first mobile device and the second mobile device to verify the identity of both the first mobile customer and the second mobile customer and confirm that both the first mobile customer and the second mobile customer approve of transferring the redeemed value of points from the point account into the transaction account;
storing, at a point database, point account data, including data associated with the number of points in the point account and associated with a value of the points; and
accessing the point database in response to the first mobile customer ID received from the first mobile device at the terminal for determining the value of points held in the point account, in order to transfer value associated with points in the point account into the transaction account, whereby the second mobile customer conducts the transaction with the third party using the transferred value of points held on behalf of the first customer in the point account.

17. The method of claim 16, wherein the third party is a merchant.

18. The method of claim 17, wherein the signaling used by the reader is short range signaling.

19. The method of claim 18, wherein the first and second mobile devices are each a wireless telephone having an RFID tag for transmitting a mobile customer ID, and the terminal includes an RFID reader for receiving the first and second mobile customer IDs.

* * * * *